June 4, 1929.  F. SCHILDMAN  1,715,790
JACKING ATTACHMENT
Filed June 13, 1927
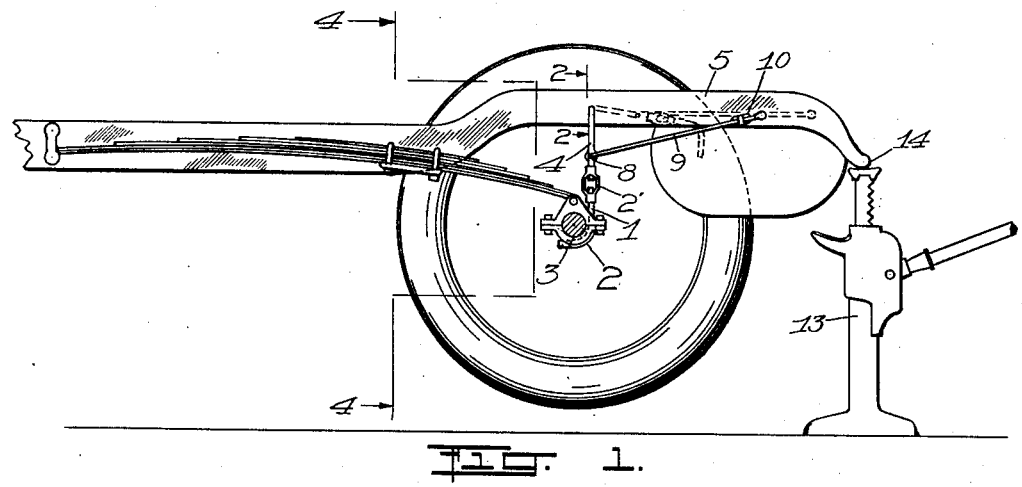
Fig. 1.
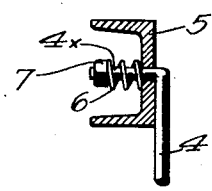
Fig. 2.
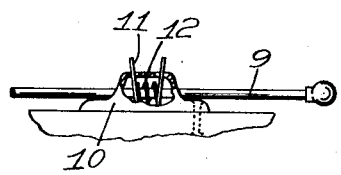
Fig. 3.
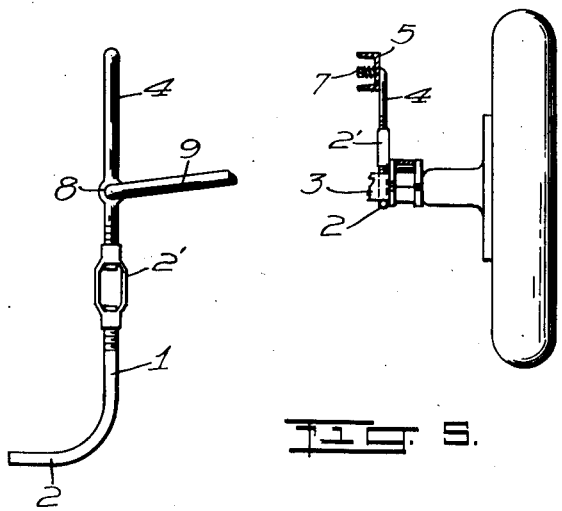
Fig. 4.
Fig. 5.
INVENTOR
F. SCHILDMAN
BY
ATTORNEYS Patented June 4, 1929.

1,715,790

UNITED STATES PATENT OFFICE.

FRED SCHILDMAN, OF WARSAW, ILLINOIS.

JACKING ATTACHMENT.

Application filed June 13, 1927. Serial No. 198,590.

My invention relates to devices for aiding in the jacking up of the wheels of motor vehicles, and it consists in the combinations, constructions, and arrangements herein described and claimed.

An object of my invention is to provide a device which will permit the use of a jack applied to the frame of a motor vehicle in the rear of the wheels, thereby obviating the necessity of placing the jack underneath the axle.

A further object is to provide a construction by means of which, when the jack is placed under the end of the frame, the movement of the latter will carry with it the axle so that the latter will be lifted to the same height as the frame.

A further object is to provide a device of the type described which is always in position for instant application to the axle and which by one movement may be removed from the axle and retained in its removed position.

A further object is to provide a device of the type described which is carried by the frame of the car in such a manner as to prevent rattling.

Other objects and advantages will appear in the following specification, and the novel features of the invention will be particularly pointed out in the appended claims.

My invention is illustrated in the accompanying drawings, forming part of this application, in which Figure 1 is a side view, showing one embodiment of my invention, Figure 2 is an enlarged section along the line 2—2 of Figure 1, Figure 3 is a detailed view showing a locking mechanism, Figure 4 is a section along the line 4—4 of Figure 1, and Figure 5 is an enlarged detail view of a portion of the device.

Referring now particularly to Figure 5, I have shown therein a rod 1 having a hook-like portion 2 adapted to extend underneath the axle housing 3 of a motor vehicle. The rod 1 is connected by means of a turnbuckle 2' to a portion 4. The latter, as will be seen from Figure 2, has a portion 4ˣ which is bent at right angles and which passes through the frame 5 of the motor vehicle. A spring 6 is disposed between the frame 5 and a nut 7 on the end of the portion 4ˣ. This portion 4ˣ forms a pivot, about which the rod may swing. The nut 7 may be tightened to exert more or less tension on the spring.

Pivotally connected at 8 with the rod portion 4 is a pull rod 9. This rod passes through a spring catch 10 which is secured to the frame 5 in the position shown in Figure 1. The catch is of that form in which two plates 11 are provided with an opening through which the rod 9 may pass, these plates being held normally in an angular position by means of a spring 12 to cause the rod to bind.

From the foregoing description of the various parts of the device, the operation thereof may be readily understood. Normally, the device is held in the dotted line position shown in Figure 1 where it is out of the way. When, however, it is desired to jack up the wheel, the plates 11 of the catch are forced together and the rod 10 is moved forwardly to swing the hook underneath the axle. Now when the jack 13 is placed underneath the end 14 of the frame 5, the latter may be raised and the axle 3 will be raised with the frame, thus obviating the necessity of getting down and putting the jack under the axle.

When the vehicle has been lowered and rests on its wheels, the hook may be swung outwardly by pressing the plates of the catch and pulling the rod 10 outwardly into the dotted line position shown in Figure 1. Here the hook will be held out of the way and virtually out of sight, and yet it may be brought into instant use, as hereinbefore described.

The provision of the spring 6 and the nut 7 on the pivot portion 4ˣ which projects through the frame holds this pivot portion in position and at the same time prevents the rattling of the parts, which might otherwise occur.

I am aware that the use of a hook of this type is not broadly new. In the present instance, however, the apparatus has been simplified so as to render it cheap to manufacture and easy to install without impairing its efficiency in any way.

I claim:

1. The combination of a vehicle frame having an opening, springs carried thereby, an axle secured to the springs, a rod having at one end a right angle bend, said bend extending through said opening in the frame to constitute a pivot for the rod, and being provided with a threaded end, a spring carried by said pivot portion and arranged to bear on the inner side of the frame, a nut carried by said pivot portion for exerting tension on the spring, said rod having a hook portion at the opposite end arranged to extend underneath the axle, a pull rod pivotally secured to said first-named rod between the hook and the pivotal portion, and means carried by the frame and arranged to receive said pull rod for locking said pull rod in its shifted positions.

2. The combination of a vehicle frame having an opening, springs carried thereby, an axle secured to the springs, a pivotal member disposed within the opening and having a turnbuckle operatively connected thereto, a rod having a hook portion at one end arranged to extend underneath the axle and operatively connected with said turnbuckle, said pivotal member being threaded and having a spring disposed thereon, a nut disposed upon the threaded portion of the pivotal member for exerting tension on the spring, a pull rod operatively connected with said pivotal member, and means carried by the frame and arranged to receive said pull rod for locking said pull rod in its shifted position.

FRED SCHILDMAN.